United States Patent [19]

Jernigan et al.

[11] 4,123,728
[45] Oct. 31, 1978

[54] ELECTROGENERATED CHEMILUMINESCENT (ECL) LASER

[75] Inventors: James L. Jernigan, Inyokern; Richard S. Hughes, China Lake; Russell R. Van Devender, Jr., Inyokern, all of Calif.

[73] Assignee: The United States of America as represented by the Secretary of the Navy, Washington, D.C.

[21] Appl. No.: 737,238

[22] Filed: Nov. 1, 1976

[51] Int. Cl.² .......................... H01S 3/20; H01S 3/09; H01S 3/081
[52] U.S. Cl. .......................... 331/94.5 L; 331/94.5 C; 331/94.5 PE
[58] Field of Search .................... 331/94.5 L, 94.5 PE, 331/94.5 C

[56] References Cited

U.S. PATENT DOCUMENTS

| | | | |
|---|---|---|---|
| 3,835,417 | 9/1974 | Schafer | 331/94.5 L |
| 3,939,439 | 2/1976 | Fletcher | 331/94.5 C |
| 3,946,332 | 3/1976 | Samis | 331/94.5 PE |
| 3,988,699 | 10/1976 | Zachariasse | 331/94.5 L |

OTHER PUBLICATIONS

Cormier et al., eds., *Chemiluminescence and Bioluminescence,* (Plenum, N.Y., 1973) pp. 193–208.
Kazarinov et al., Sov. Phys–Semicond., vol. 6, No. 7, Jan. 1973, pp. 1184–1189.

*Primary Examiner*—William D. Larkins
*Attorney, Agent, or Firm*—R. S. Sciascia; Roy Miller; Don Mollick

[57] ABSTRACT

A laser using electrogenerated chemiluminescence wherein an organic dye lasing solution is made to flow through or over alternately charged electrodes to charge the dye molecules which are then hydrodynamically diffused to maximize the production of excited molecules, for stimulated emission.

6 Claims, 6 Drawing Figures

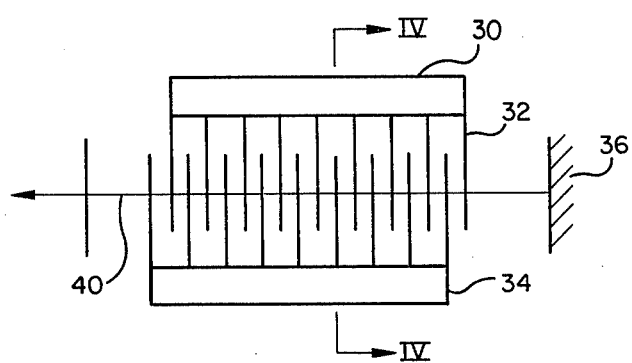
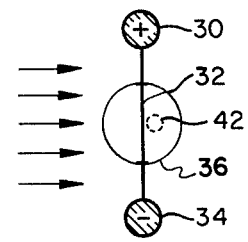
Fig. 3                Fig. 4
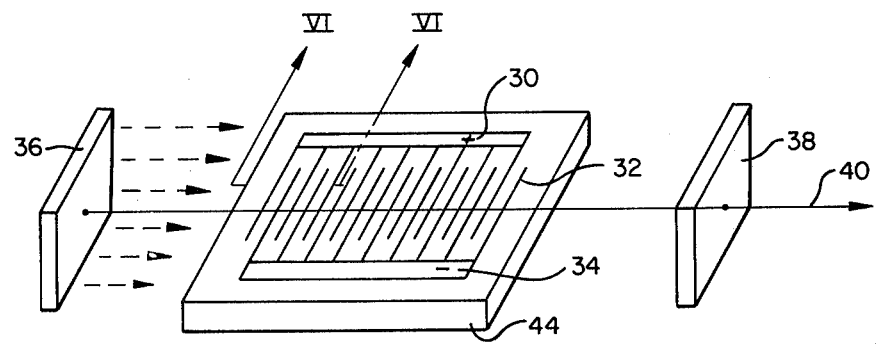
Fig. 5
Fig. 6

ELECTROGENERATED CHEMILUMINESCENT (ECL) LASER

BACKGROUND OF THE INVENTION (1) Field of the Invention

The present invention relates to lasers, and more particularly to a hydrodynamic, electrogenerated chemiluminescent laser.

The phenomenon of electrogenerated chemiluminescence (ECL) has been known since 1964 and is described in detail by Allen J. Bard et al., *Chemiluminescence* and *Bioluminoscence*, pp 193–208 (1973). with a solution made up of an appropriate solvent, organic dye, supporting electrolyte, etc., dye anions will be created at the surface of negatively charged electrode which is immersed in the solution according to $$D + e \rightarrow D^-, \quad (1)$$

and at the surface of a positively charged electrode which is immersed in the solution cations will be produced according to $$D \rightarrow D^+ + e \text{ and} \quad (2)$$

$$D^- \rightarrow D^+ + 2e. \quad (3)$$

After their production, the anions and/or cations diffuse from the electrode or electrodes. If the anions and cations can be brought together, i.e., by diffusion, etc., the following electron exchange interaction can occur, $$D^+ + D^- \rightarrow D^* + D, \quad (4)$$

and the excited dye molecules, $D^*$, can yield light according to $$D^* \rightarrow D + h\nu. \quad (5)$$

(2) Description of the Prior Art

The main disadvantage of current dye lasers is the reliance upon optical pumping. This means that either another laser, such as a nitrogen or argon laser, or a flashlamp has to be used to excite the dye, with attendant high cost, large size and poor efficiency.

The semiconductor laser, on the other hand, offers some cost, size and efficiency advantages over the dye laser, but at the expense of power, tunability, range of wavelength and spectral and coherent properties.

SUMMARY OF THE INVENTION

Accordingly, the present invention provides a hydrodynamic ECL laser which excites the organic dye molecules directly by electrical means to provide the advantages of the dye laser without the attendant disadvantages due to the required optical pumping. Hydrodynamically enhanced diffusion to maximize the rate of production of excited state dye molecules is achieved by flowing a suiable dye solution past alternately charged electrodes in a manner to produce turbulent mixing. The turbulent mixing provides extremely good mixing of the dye molecule cations and anions produced as a result of the charged electrodes. Laser action is then achieved through the use of a suitable laser cavity.

BRIEF DESCRIPTION OF THE DRAWING

FIG. 3 is a schematic of an ECL laser using an alternate electrode configuration;

FIG. 4 is a cross-sectional view of the ECL laser of FIG. 3 taken along line IV—IV;

FIG. 5 is a perspective view of another embodiment of an ECL laser; and

FIG. 6 is a cross-sectional view of part of the ECL laser of FIG. 5 along line VI—VI illustrating how turbulent flow is achieved.

DESCRIPTION OF THE PREFERRED EMBODIMENT

If a sufficiently large number of excited dye molecules per unit volume are produced in a time comparable to the lifetime of the excited species, population inversion is achieved. The rate of production of the excited dye molcules is governed by the processes which bring the cations, $D^+$, and anions, $D^-$, together plus the time it takes for the subsequent electron exchange interaction to occur. Since the electron exchange interaction occurs in times of the order of $10^{-12}$ seconds, only the processes involved in bringing the cations and anions together is considered.

Figure 1:
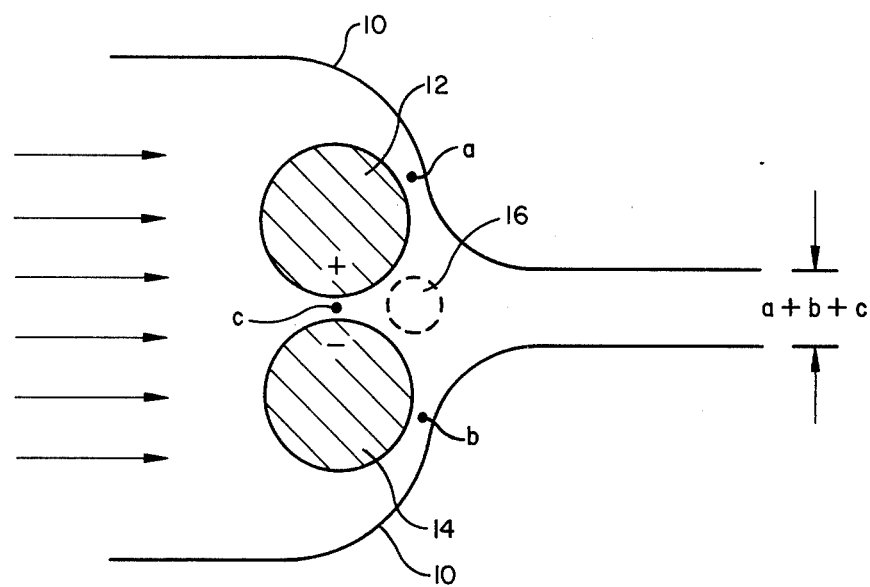
FIG. 1 is a cross-sectional view of an ECL laser.

Referring now to FIG. 1, a solution, made up of an appropriate solvent, dye, supporting electrolyte, etc., is confined by surfaces 10 defining a dye cell and is flowing from left to right as indicated by the arrows. Cations are produced at a positive electrode 12 and anions are produced at a negative electrode 14. If the Reynolds number, given by $$N_R = \rho V d/\mu, \quad (6)$$

where $\rho$ = solution density,
$V$ = solution velocity,
$d$ = reference dimension of electrodes, and
$\mu$ = solution viscosity,
is sufficiently high so as to provide for completely turbulent flow in region 16, extremely good mixing occurs in that region just downstream from the electrodes 12,14. It is in this relatively small region 16 that the rate of production of excited dye molecules, $D^*$, is the greatest and laser action occurs.

Figure 2:
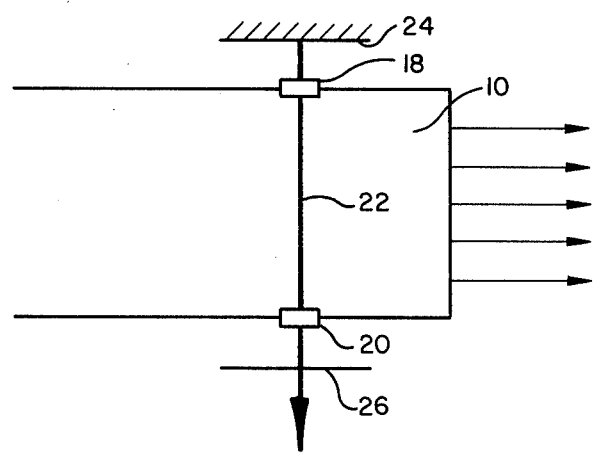
FIG. 2 is a top view of the ECL laser.

In FIG. 2, transparent windows 18,20 are provided in surfaces 10 along the optical path 22, the optical path being orthognal to the direction of solution flow as indicated by the arrows. A back mirror 24 and an output mirror 26 are located one on each side exterior to the dye cell and opposite the windows 18,20 to complete the laser cavity. Optical energy generated by the electron exchange interaction in region 16 passes through window 18, is reflected by back mirror 22 back through window 18 and the dye cell and then through window 20 to the output mirror 26. At output mirror 26, part of the optical energy is reflected back through window 20 to maintain resonant laser action, and the remainder is the usable output energy.

The distance, and hence the time, that the anions and cations travel to the mixing region 16 can be decreased by reducing the electrode dimensions. FIGS. 3 and 4 illustrate an interdigitated electrode configuration. A positive electrode 30 has a plurality of "wires" 32 attached thereto which are interdigitated with a plurality of "wires" connected to a negative electrode 34. A back mirror 36 and an output mirror 38 complete a laser cavity with an optical path 40 between the mirrors and transverse to the "wires". An appropriate ECL solution flows orthogonally to both the "wires" 32 and the optical path 40 with the highest mixing rate, and hence laser action, occuring in the mixing region 42.

As illustrated in FIG. 5, the interdigitated electrode configuration could be fabricated by vacuum deposition of a conducting material onto a substrate 44 and the mixing achieved by flowing the ECL solution over the substrate parallel to the optical axis 40, as indicated by the dotted arrows. The mixing action can be introduced in any of a number of ways, such as with the "rippled" top 46 of FIG. 6 which defines the upper surface of the solution.

The concept of distributed feedback can be incorporated in the planar interdigitated electrode ECL laser described above. Distributed feedback, sometimes called corrugated feedback, uses a periodic spatial disturbance within or on the surface of a lasing material and is provided by Bragg coupling. Fundamental Bragg coupling of a laser requires a corrugation (periodic variation) with a period of approximately $\lambda/(2n)$ or integer multiple thereof, where $\lambda$ is the optical wavelength and $n$ is the index of refraction of the lasing solution. Thick electrodes, or dielectric ridges between electrodes, could be fabricated with a period of $\lambda/(2n)$ or an integer multiple of $\lambda/(2n)$ so as to satisfy the Bragg coupling requirement.

Two advantages would be realized by the incorporation of distributed feedback. First, no end mirrors are needed, and, secondly, the lasing threshold is reduced.

What is claimed is:

1. An electrogenerated chemiluminescent laser comprising:
   a lasing solution which comprises an organic dye and a supporting electrolyte mixed with a solvent so as to exhibit the phenomenon of electrogenerated chemiluminescence;
   a resonant laser cavity having an output window and containing said lasing solution;
   a pair of electrodes, each of which have a plurality of wires attached thereto;
   said pair of electrodes forming an interdigitated electrode configuration as a means for electrically stimulating said lasing solutin to produce cations and anions; and
   means for hydrodynamically mixing said cations and anions to produce laser action in said laser cavity.

2. An electrogenerated chemiluminescent laser as recited in claim 1 wherein;
   said pair of electrodes are oppositely charged.

3. An electrogenerated chemiluminescent laser as recited in claim 1 wherein;
   said means for hydrodynamically mixing said cations and anions comprises means for flowing said lasing solution through said wires to said interdigitated electrode pair.

4. An electrogenerated chemiluminescent laser as recited in claim 1 wherein;
   said interdigitated electrode pair comprises conducting material deposited upon a substrate.

5. An electro generated chemiluminescent laser as recited in claim 4 wherein;
   said plurality of wires of each of said pair of electrodes comprises a corrugated surface on said substrate of period $z\lambda/(2n)$, where $z$ is an integer, $\lambda$ is the optical wavelength of said electrogenerated chemiluminescent laser, and $n$ is the index of refraction of said lasing solution, such that distributed feedback occurs.

6. An electrogenerated chemiluminescent laser as recited in claim 4 wherein:
   said means for hydrodynamically mixing said cations and anions comprises a rippled top positioned over said interdigitated electrode pair and substrate, and means for flowing said lasing solution over said substrate across said interdigitated electrode pair, the construction of said substrate being such as to cause mixing of said cations and anions as said lasing solution flows thereunder.

* * * * *